US012240674B2

(12) United States Patent
Pivac et al.

(10) Patent No.: US 12,240,674 B2
(45) Date of Patent: Mar. 4, 2025

(54) ADHESIVE CARTRIDGE

(71) Applicant: FASTBRICK IP PTY LTD, High Wycombe (AU)

(72) Inventors: Mark Joseph Pivac, Lesmurdie (AU); Harald Apfelthaler, Kalamunda (AU)

(73) Assignee: FASTBRICK IP PTY LTD, Hign Wycombe (AU)

( * ) Notice: Subject to any disclaimer, the term of this patent is extended or adjusted under 35 U.S.C. 154(b) by 788 days.

(21) Appl. No.: 17/273,479

(22) PCT Filed: Sep. 4, 2019

(86) PCT No.: PCT/AU2019/000103
§ 371 (c)(1),
(2) Date: Mar. 4, 2021

(87) PCT Pub. No.: WO2020/047574
PCT Pub. Date: Mar. 12, 2020

(65) Prior Publication Data

US 2021/0339932 A1 Nov. 4, 2021

(30) Foreign Application Priority Data

Sep. 4, 2018 (AU) ................................ 2018903273

(51) Int. Cl.
*B65D 77/06* (2006.01)
*B05C 5/00* (2006.01)
(Continued)

(52) U.S. Cl.
CPC .............. *B65D 77/06* (2013.01); *B05C 5/002* (2013.01); *B05C 5/0225* (2013.01); *B65D 85/70* (2013.01);
(Continued)

(58) Field of Classification Search
CPC .. B65D 77/06; B65D 85/70; B65D 2577/041; B65D 2583/005; B05C 5/002;
(Continued)

(56) References Cited

U.S. PATENT DOCUMENTS 4,199,082 A * 4/1980 Ornsteen ........... B05C 17/00543 222/323
7,762,088 B2 * 7/2010 Fiske .................... B05C 5/0225 62/3.64
(Continued)

FOREIGN PATENT DOCUMENTS

CN 1849486 A 10/2006
CN 101360873 A 2/2009
(Continued)

OTHER PUBLICATIONS

International Search Report for International Application No. PCT/AU2019/000103 mailed Oct. 28, 2019 (8 pages).
(Continued)

*Primary Examiner* — Nicolas A Arnett
(74) *Attorney, Agent, or Firm* — Merchant & Gould P.C.

(57) ABSTRACT

The present disclosure provides an adhesive cartridge for an automated brick laying machine, the adhesive cartridge comprising a bladder for the adhesive, a shell for the bladder, the shell comprising an aperture therethrough, and at least one valve assembly for controlling adhesive flow, the valve assembly comprising a valve body, at least a portion of which extends through the aperture and into the shell. Also disclosed is a method for assembling the adhesive cartridge, a method of filling the adhesive cartridge and an automated bricklaying machine having a bricklaying and adhesive applying head incorporating the adhesive cartridge.

19 Claims, 15 Drawing Sheets

(51) Int. Cl.

| | |
|---|---|
| ***B05C 5/02*** | (2006.01) |
| ***B65D 85/00*** | (2006.01) |
| ***E04G 21/20*** | (2006.01) |
| ***E04G 21/22*** | (2006.01) |

(52) U.S. Cl.

CPC ............. *E04G 21/20* (2013.01); *E04G 21/22* (2013.01); *B65D 2577/041* (2013.01); *B65D 2583/005* (2013.01)

(58) Field of Classification Search

CPC ....... B05C 5/0225; E04G 21/16; E04G 21/20; E04G 21/22

See application file for complete search history.

(56) References Cited

U.S. PATENT DOCUMENTS

| | | | | |
|---|---|---|---|---|
| 8,166,727 | B2 * | 5/2012 | Pivac | B25J 5/00 52/749.11 |
| 8,825,208 | B1 * | 9/2014 | Benson | E04F 21/02 700/247 |
| 8,978,581 | B2 * | 3/2015 | Yano | B25J 9/1679 118/667 |
| 9,821,473 | B2 * | 11/2017 | Kilibarda | B25J 9/10 |
| 2011/0031270 | A1 * | 2/2011 | Choiniere | E04D 15/04 222/626 |
| 2012/0053726 | A1 * | 3/2012 | Peters | B25J 11/00 700/254 |
| 2012/0193376 | A1 * | 8/2012 | Evans | B05B 11/048 222/207 |

FOREIGN PATENT DOCUMENTS

| | | | |
|---|---|---|---|
| CN | 102916529 | A | 2/2013 |
| CN | 204311767 | U | 5/2015 |
| CN | 106703428 | A | 5/2017 |
| EP | 2554276 | A1 | 2/2013 |
| JP | 2002121902 | A | 4/2002 |
| WO | 2008/097680 | A1 | 8/2008 |
| WO | 2018/009978 | A1 | 1/2018 |
| WO | 2018/009981 | A1 | 1/2018 |

OTHER PUBLICATIONS

Extended European Search Report for EP Application No. 19858495.5 mailed Apr. 14, 2022 (8 pages).

Chinese Office Action for CN Application No. 201980069477.6 mailed Mar. 29, 2022 (23 pages, with English Translation).

Chinese Office Action received for CN Application No. 201980069477.6 on Dec. 2, 2022, 10 pgs.

Chinese Office Action received for CN Application No. 201980069477.6 on Jun. 25, 2023, 10 pgs.

United Arab Emirates Office Action received for UAE Application No. P6000306/2021 on Jun. 15, 2023, 11 pgs.

European Office Action received for EP Application No. 19858495.5 on Mar. 28, 2023, 4 pgs.

Chinese Office Action received for CN Application No. 201980069477.6 on Mar. 29, 2022, 23 pgs.

* cited by examiner

ADHESIVE CARTRIDGE

RELATED APPLICATIONS

This application is a National Stage Application of PCT/AU2019/000103, filed 4 Sep. 2019, which claims benefit of Ser. No. 20/189,03273, filed 4 Sep. 2018 in Australia and which applications are incorporated herein by reference. To the extent appropriate, a claim of priority is made to each of the above disclosed applications. In addition, this application is related to International Patent Application No. PCT/AU2017/050728 (WO/2018/009978) titled "ADHESIVE APPLICATOR AND OBJECT PLACING HEAD INCORPORATING THE SAME" in the name of Fastbrick IP Pty Ltd, and International Patent Application No. PCT/AU2017/050731 (WO/2018/009981) titled "BRICK/BLOCK LAYING MACHINE INCORPORATED IN A VEHICLE" in the name of Fastbrick IP Pty Ltd., which applications are hereby incorporated by reference herein in its entirety for all purposes.

TECHNICAL FIELD

The present disclosure relates generally to robots having end effectors dispensing adhesive, an automated brick laying machine, a brick laying and adhesive applying head assembly for such a machine, and a means for supplying adhesive to such a head assembly.

BACKGROUND

International Patent Application No. PCT/AU2017/050728 (WO/2018/009978) discloses a brick laying and adhesive applying head (or lay head) which is fitted to an articulated telescopingly extendable boom mounted on a truck, forming an automated brick laying machine. The lay head includes an adhesive applicator which applies adhesive to a brick, and comprises a robot which lays the brick.

A frame of the truck supports an adhesive container and an adhesive pump. The adhesive pump supplies pressurised adhesive to fluid conveying apparatus in the form of a hose which runs out along the boom to the lay head.

While workable, the above described arrangement presented a number of technical challenges associated with pumping the adhesive over what is a variable, but always considerable distance from the adhesive container on the frame, to the lay head, and then purging the system of adhesive post operation, so as to prevent the adhesive from solidifying in the system and causing blockages.

It will be appreciated however that this problem will not be unique to automated brick laying machines, but common to robot end effectors dispensing adhesive onto various types of workpiece.

It is against this background and the problems and difficulties associated therewith that the present invention has been developed.

Other objects and advantages of the present invention will become apparent from the following description, taken in connection with the accompanying drawings, wherein, by way of illustration and example, at least one embodiment of the present invention is disclosed.

SUMMARY

In one broad, an aspect of the present invention seeks to provide an adhesive cartridge for an automated brick laying machine, the adhesive cartridge comprising a bladder for the adhesive, a shell for the bladder, the shell comprising an aperture therethrough, and at least one valve assembly for controlling adhesive flow, the valve assembly comprising a valve body, at least a portion of which extends through the aperture and into the shell.

It will be appreciated however that this cartridge is not limited to use with adhesives and could find use containing other fluids. Fluids where contamination is to be avoided would be particularly suitable for use in the cartridge such as fluids from the human body, intravenous (IV) fluids and the like. Such fluids could also be samples or the like obtained from or for the marine industry, space exploration, or industrial, medical, military or food applications.

According to a further aspect then, there is provided a fluid cartridge comprising a bladder for the fluid, a shell for the bladder, the shell comprising an aperture therethrough, and at least one valve assembly for controlling fluid flow, the valve assembly comprising a valve body, at least a portion of which extends through the aperture and into the shell.

In one embodiment, the at least a portion of the valve body also extends through an aperture in the bladder.

In one embodiment, the valve body comprises a first valve port providing an opening inside of the bladder, a second port providing an opening outside of the shell, a passageway extending between the first and second ports, and a third port intersecting the passageway and opening outside of the shell.

In one embodiment, the adhesive cartridge further comprises a valve element which comprises a passageway therethrough to permit flow between the first and second ports of the valve body, a membrane seal blocking this passageway, and wherein the valve element is movable relative to the valve body between a first position in which it blocks the third port, and a second position in which it opens the third port.

In one embodiment, the valve assembly includes a seal between the valve body and the valve element to prevent ingress of adhesive therebetween.

In one embodiment, the valve element has a thread or barb to assist in positioning thereof relative to the valve body.

In one embodiment, the valve body is generally elongate, tubular and cylindrical, and comprises the first valve port at a first end, the second valve port at a second end, and the third valve port in a side thereof.

In one embodiment, the valve element comprises a generally elongate, tubular and cylindrical body comprising a portion defining a piston at a first end, and a tube connection fitting at a second end, and a portion comprising an external screw thread between the ends.

In one embodiment, the second port of the valve body is defined by a collar provided with an internal screw thread, so that the valve element can be screwed into and out of the valve body.

In one embodiment, a spigot defines the first valve port, and the spigot comprises an external screw thread.

In one embodiment, the adhesive cartridge further includes a nut for the spigot, where both the spigot and the nut comprise a flange between which a portion of the bladder is captured, and sealed against adhesive leaks by way of at least one washer clamped between the flanges.

In one embodiment, the third valve port comprises an internal thread for receiving a tube connection fitting.

In one embodiment, the valve body further comprises a groove extending around an outside diameter thereof, wherein in use, this groove receives a clip to assist in the securement of the valve assembly to the shell.

In one embodiment, the clip reduces relative movement between the valve assembly and the shell.

In one embodiment, the adhesive cartridge comprises a cuboid shape.

In one embodiment, the shell comprises a box.

In one embodiment, the shell is made of a material selected from cardboard, corflute, plastic or a hybrid material. In one form, the shell is made from a corrugated water resistant material. For example, the shell could also be made from cardboard with a plastic or wax coating. The shell may be coated with a reflective material to provide insulation or at least partially shrouded by a heating blanket or the like. In other forms, the shell may be made from hybrid or composite materials with integrated insulation or heating.

In one embodiment, the material has a water resistant coating.

In one embodiment, the coating is reflective.

In one embodiment, the bladder is made of a flexible aluminium composite foil.

In one embodiment, the valve assembly is configured to allow controllable adhesive filling of and dispensing from the adhesive cartridge.

In one embodiment, the cartridge is for a single-use.

In one embodiment, the adhesive cartridge is adapted to be releasably secured with respect to a brick laying and adhesive applying head of an automated brick laying machine and supply an adhesive for the application onto bricks when secured.

In another broad form, an aspect of the present invention seeks to provide a method for assembling the above described adhesive cartridge, the method comprising the steps of securing the valve assembly with respect to the bladder, and then placing the bladder, and a portion of the valve assembly, inside of the shell and then securing the valve assembly with respect to the shell.

In another broad form, an aspect of the present invention seeks to provide a method for filling the above described adhesive cartridge with adhesive, the method comprising the steps of evacuating the bladder of air using a vacuum pump, and then filling the bladder with the adhesive.

In one embodiment, the method comprises the step of moving the valve element to its second position, in which it opens the third port, and then applying the vacuum pump via the third port to evacuate air from the bladder.

In one embodiment, the method comprises the further steps of inflating the bladder with air and pressure testing prior to evacuation. This will ensure that the bladder is properly formed, and will not leak fluid.

In one embodiment, post evacuation, the method comprises the further step of pumping adhesive into the cartridge via the third port, and then setting the valve element to its first position, in which it closes the third port to seal the adhesive in the cartridge.

In one embodiment, the adhesive is pumped into the cartridge from an adhesive supply via a first line which is connected to the third port via a valve that is also connected to the vacuum pump via a second line, the valve operable to selectively open and close each line to the third port.

In another broad form, an aspect of the present invention seeks to provide a method of preparing the above described adhesive cartridge for use with an automated bricklaying machine including a brick laying and adhesive applying head, the method comprising the steps of securing the adhesive cartridge to the brick laying and adhesive applying head and connecting a supply line to the adhesive cartridge.

In one embodiment, the method comprises the further steps of securing an adhesive fitting with a sharpened tip to the supply line, and then inserting the adhesive fitting into and down the passageway through the valve element tip first, until the sharpened tip punctures the membrane seal, to thereby allow adhesive to flow from the bladder into the supply line.

In another broad form, an aspect of the present invention seeks to provide an end effector for a robot including an adhesive application system, wherein the end effector is adapted to releasably retain an adhesive cartridge that is configured to dispense adhesive therefrom onto an object.

In one embodiment, the end effector comprises, or is a part of, a brick laying and adhesive applying head assembly for an automated brick laying machine.

In another broad form, an aspect of the present invention seeks to provide a brick laying and adhesive applying head assembly for an automated brick laying machine, wherein the head assembly is adapted to releasably retain an adhesive cartridge that is configured to dispense adhesive therefrom onto a brick.

In one embodiment, the brick laying and adhesive applying head is so adapted by way of comprising a means for retaining the cartridge, and a means for drawing the adhesive from the cartridge.

This places the adhesive supply close to the point at which it is dispensed onto the brick (or other workpiece as the case may be). Moreover, by releasably retaining the adhesive cartridge, the adhesive cartridge can be replaced when exhausted, eliminating the need to purge an adhesive reservoir which is not replaceable.

In yet a further broad form, an aspect of the present invention seeks to provide an automated brick laying machine comprising the above described brick laying and adhesive applying head assembly.

It will be appreciated that the broad forms of the invention and their respective features can be used in conjunction, interchangeably and/or independently, and reference to separate broad forms is not intended to be limiting.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
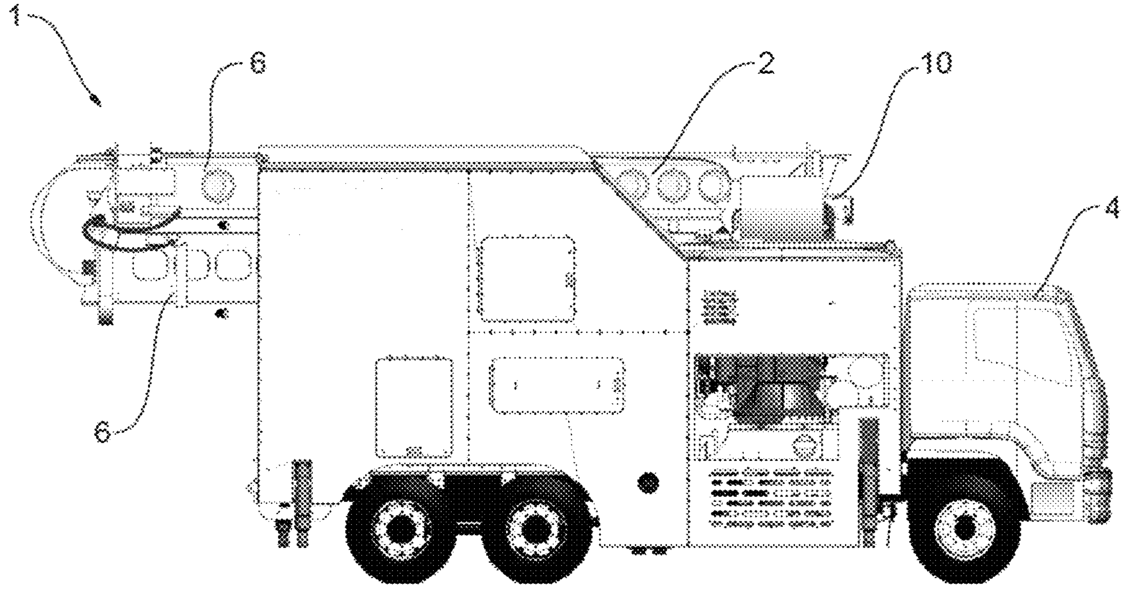
FIG. 1 is a schematic illustration of an automated brick laying machine comprising a telescopingly extendable boom in its retracted position.

Referring now to FIG. 1, where there is illustrated an automated brick laying machine 1. Details of the machine 1 which are similar to those of the machine disclosed in WO2018/009978 and WO2018/009981 will only be discussed briefly here.

Figure 2:
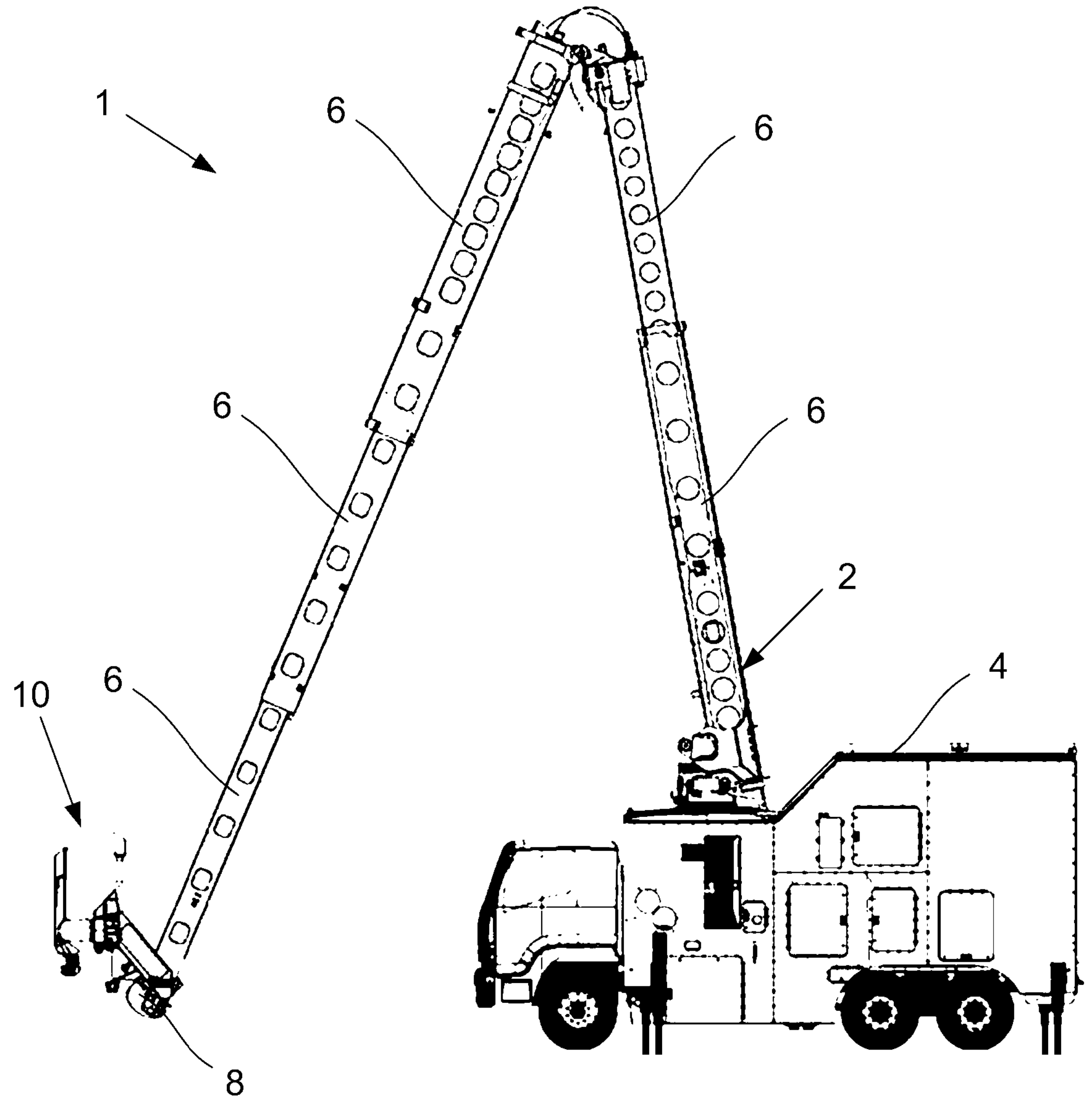
FIG. 2 is a schematic illustration of the automated brick laying machine with the boom extended.

The machine 1 comprises an articulated telescopingly extendable boom 2 mounted on a truck 4, and a brick laying and adhesive applying head (lay head) 10 mounted to the end of the boom 2. In FIG. 1, the boom 2 is shown retracted for transport, and in FIG. 2 the boom 2 is shown extended in one configuration, and ready for use to lay bricks.

The boom 2 is comprised of a series of boom elements or sticks 6, each of which is provided with an internal shuttle. These shuttles are not visible in FIGS. 1 and 2 on account of being internal to the sticks 6. Each of the shuttles is fitted with a gripper for holding a brick. The shuttles move a brick from the truck 4, along the boom 2 and pass it from one shuttle to the next, and then onto a flipper assembly 8.

The flipper assembly 8 is located at the distal end of the most distal stick 6 of the boom 2. The flipper assembly 8 comprises a gripper with jaws to grip a brick and then translate and rotate the brick to move it past an adhesive applicator assembly, and then present the brick for transfer to a laying arm 12 which depends from the lay head 10.

Figure 3:
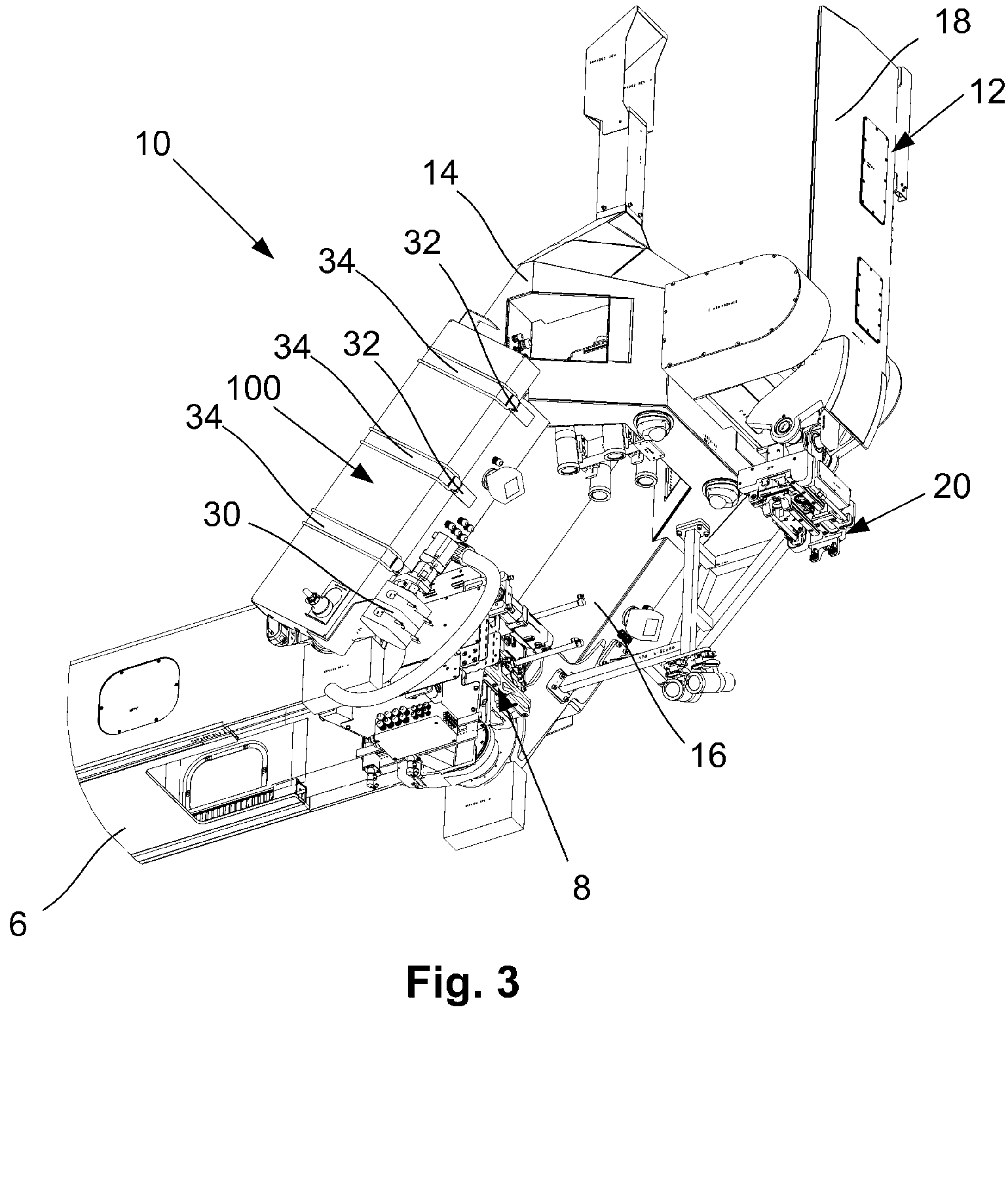
FIG. 3 is an underside perspective view of a lay head assembly of the automated brick laying machine of FIG. 1.
Figure 4:
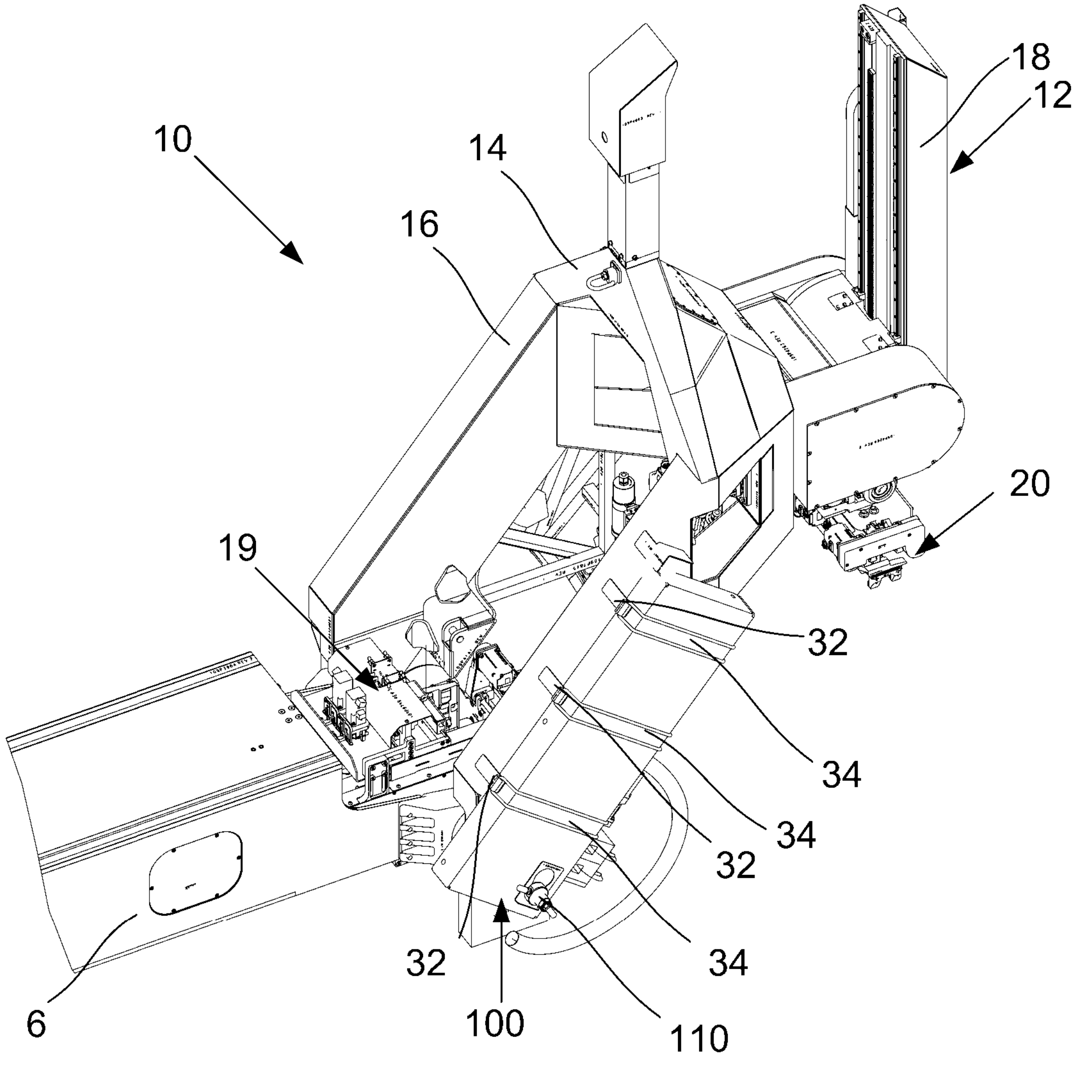
FIG. 4 is an upper perspective view of the lay lead assembly of FIG. 3.
Figure 5:
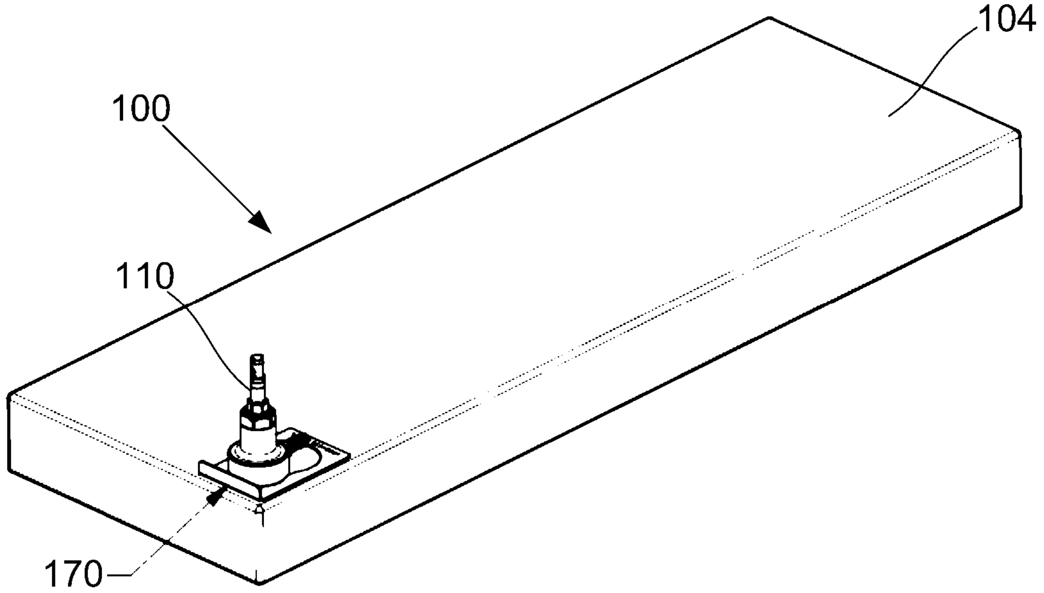
FIG. 5 is an isometric view of an adhesive cartridge for use by the automated brick laying machine of FIG. 1.
Figure 6:
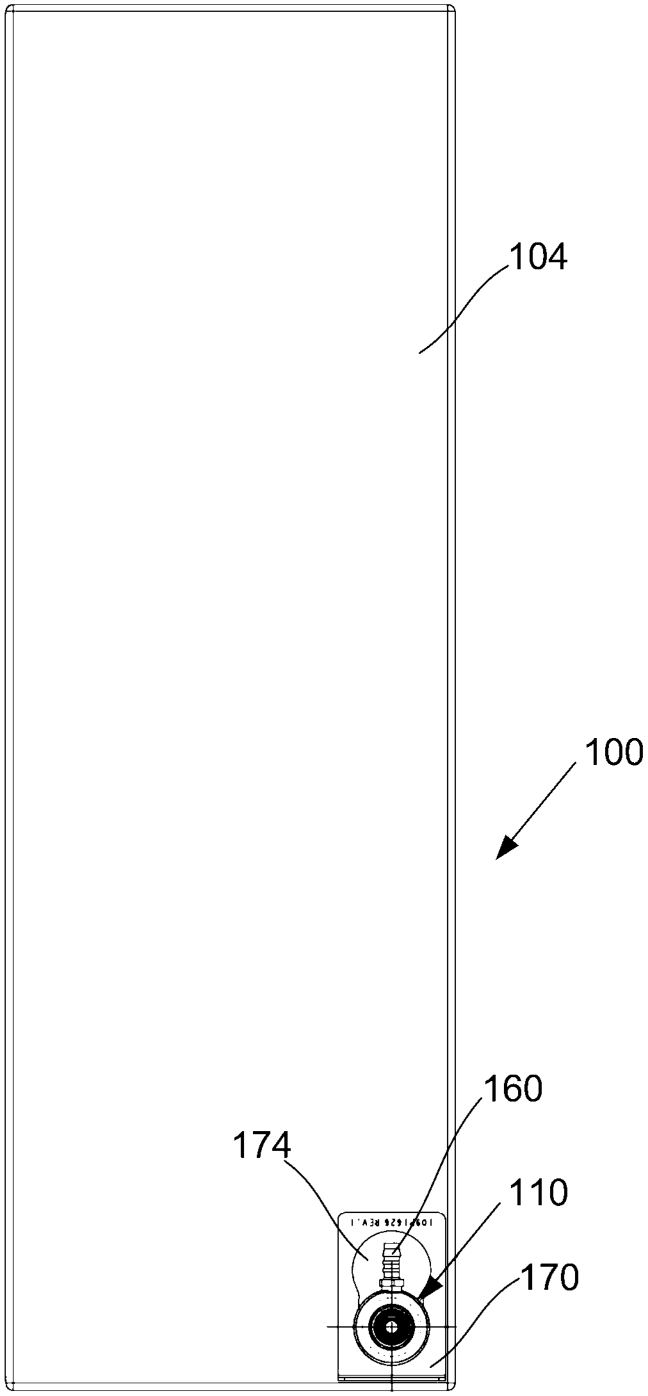
FIG. 6 is a top view of the adhesive cartridge of FIG. 5.
Figure 7:
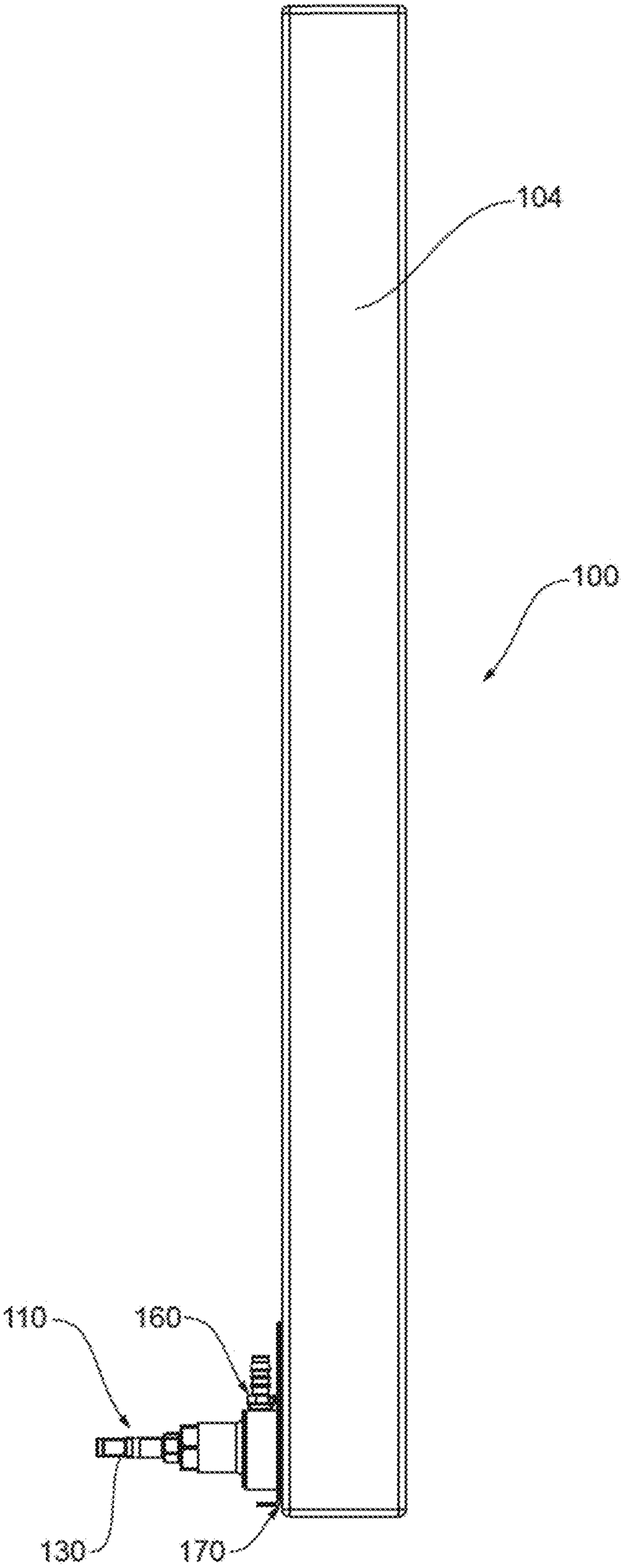
FIG. 7 is an side view of the adhesive cartridge of FIG. 5.
Figure 8:
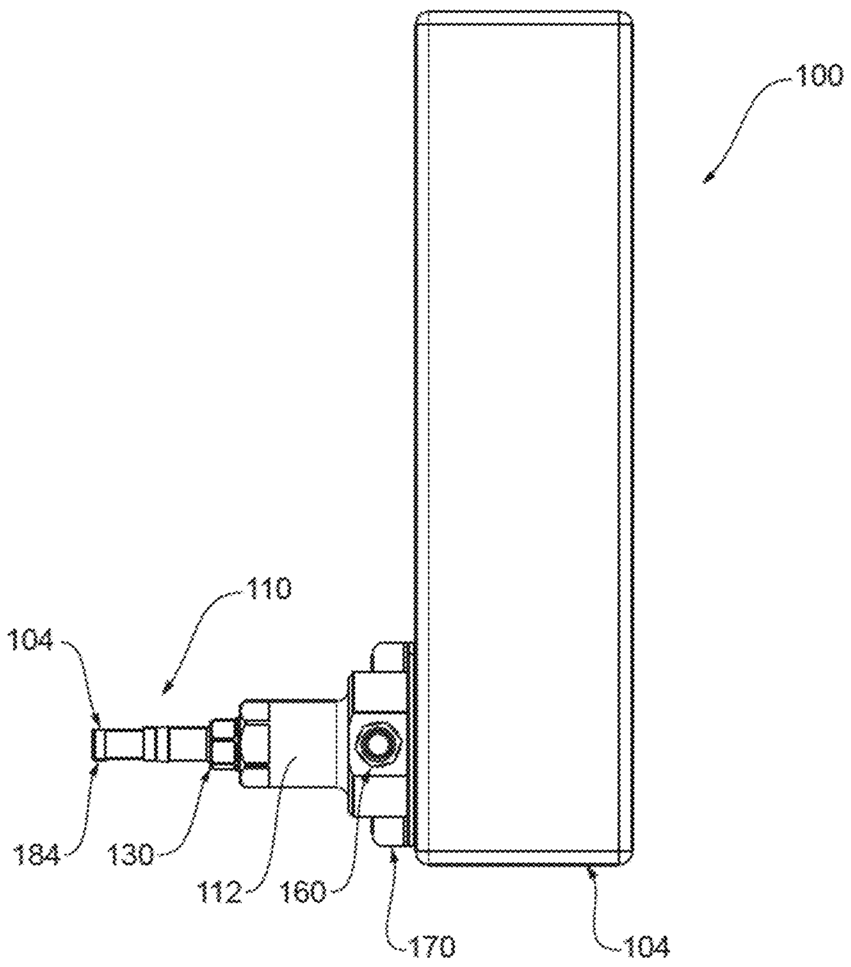
FIG. 8 is an end view of the adhesive cartridge of FIG. 5.

Referring now to FIGS. 3 and 4, the lay head 10 comprises a clevis shaped body 14 comprising a pair of arms 16 via which the clevis 14 is pivotally mounted. Typically, during operation, the lay head 10 remains in a vertically upright orientation.

The laying arm 12 comprises a robotic arm 18 which is pivotably mounted to the clevis 14 via a slewing drive, and to the end of which is fitted an end effector 20 in the form of a gripper comprising a pair of jaws, for handling the bricks and laying them.

The lay head 10 further comprises an adhesive application system. The adhesive application system comprises a replaceable adhesive cartridge 100, an adhesive supply line extending from the cartridge 100 to an adhesive applicator assembly 19, and at least one adhesive pump 30 for delivering adhesive to the adhesive applicator assembly 19.

The adhesive applicator assembly 19 depends from the last stick of the boom 2, and in one example is mounted to the flipper assembly 8.

One of the arms 16 of the clevis 14 comprises a mounting position for the adhesive cartridge 100 on an outwardly directed surface thereof. In one example, a series of guide tabs 32 extend from the arm 16 and define a recess which is sized to receive the adhesive cartridge 100. Some of the tabs 32 are arranged in opposing pairs so that straps 34 can be passed between these tabs 32 and over the adhesive cartridge 100 to secure the adhesive cartridge 100 with respect to the arm 16, and the lay head 10 in turn. The straps 34 could take any suitable form and in one example are bungy or shock cords which extend between opposing pairs of tabs 32 on arm 16.

The cartridge 100 has a length and a width which closely match the dimensions of the arm 16. The thickness of the cartridge is small compared to the width, so as to minimise the extent to which it extends outward from the arm 16, and is thus exposed. In the case of the illustrated embodiment, the cartridge 100 has a capacity of approximately 15 to 20 litres, which should be sufficient for the construction of an average sized brick house. It is to be appreciated however that the capacity could be higher depending on the size of the build and in some examples could be 15 to 40 litres.

It can be seen that adhesive pump 30 is positioned adjacent to the mounting position for the adhesive cartridge 100, so as to maximise the responsiveness of adhesive supply.

Alternate possible means via which the lay head 10 can retain the cartridge may comprise powered releasable grippers which grip around the cartridge 100, or the lay head 10 may comprise a plurality of twist lock pins, and the cartridge 100 may comprise sockets for receiving these pins.

With reference to FIGS. 5 through 8, it can be seen that in the case of the illustrated embodiment, the adhesive cartridge 100 comprises a cuboid shape and a valve assembly 110 in a wall thereof.

Figure 9:
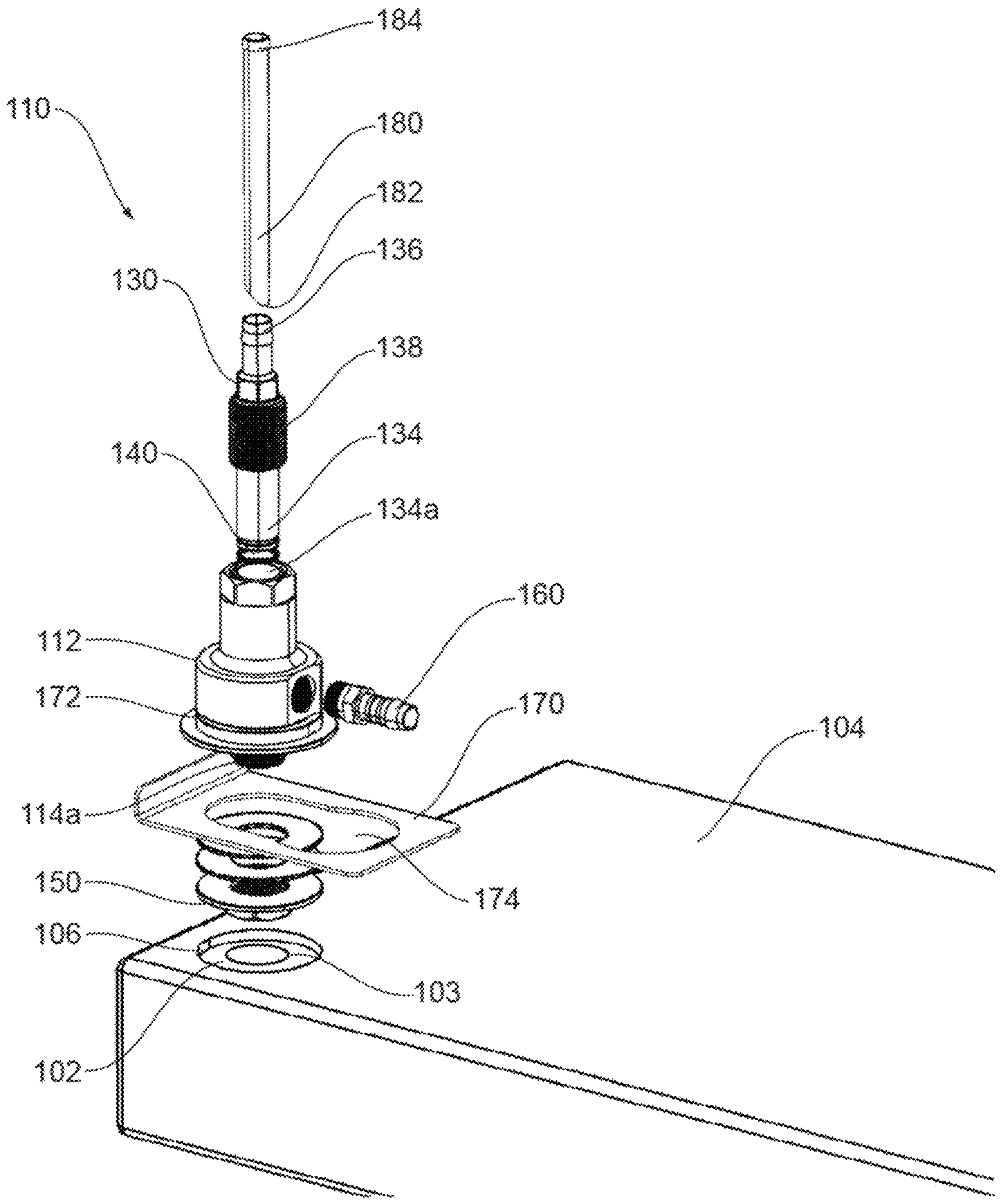
FIG. 9 is an exploded view of a valve assembly from the adhesive cartridge of FIG. 5.
Figure 10:
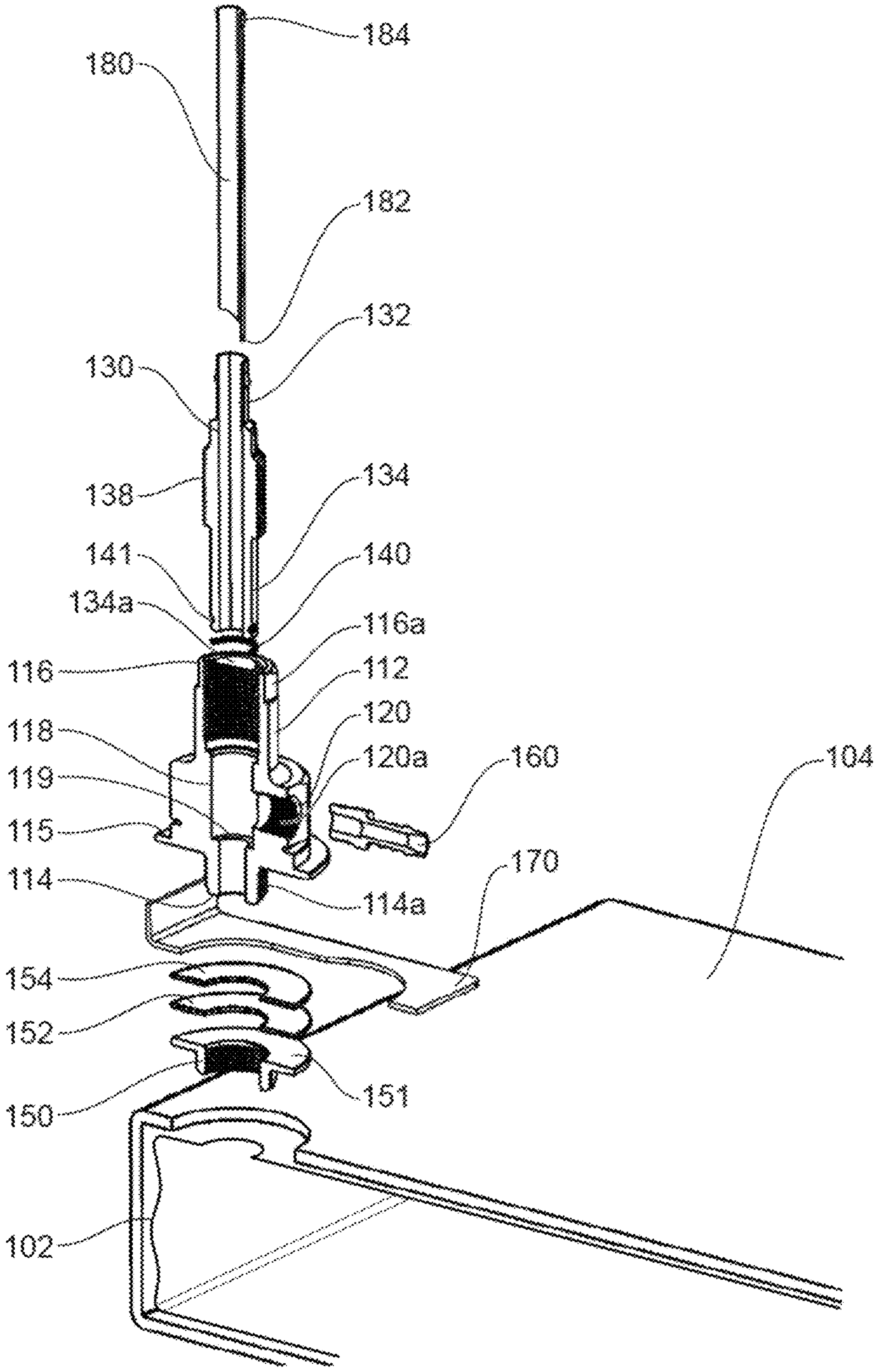
FIG. 10 is a sectioned exploded view of the valve assembly and adhesive cartridge.

Referring now to FIGS. 9 and 10, it can be seen that the adhesive cartridge 100 comprises a bladder 102 for the adhesive, a shell 104 for the bladder, the shell 104 comprising an aperture 106 therethrough, and the valve assembly 110 for controlling adhesive flow, the valve assembly 110 comprising a valve body 112, at least a portion of which extends through the aperture 106 and into the shell 104. The at least a portion of the valve body 11 also extends through an aperture 103 in the bladder 102.

The shell 104 gives shape to the cartridge 100, and provides protection for the bladder 102 against rips and punctures.

In the case of the illustrated embodiment, the shell 104 comprises a box of corflute, although any material of sufficient rigidity could be used. In particular, a corrugated water resistant material is preferred. In some examples a hybrid or composite material may be used such as cardboard with a plastic or wax coating. In some examples, the shell 104 may be coated with a reflective material for insulation or insulating or heating may be integrated into the shell 104. In other examples, cardboard with a water proof coating may be used. In general, low cost materials such as cardboard and corflute are preferable to more expensive materials such as sheet metal or composites.

The bladder 102 comprises a bag of aluminium composite foil with heat sealed seams, which is sized to substantially fill the shell 104 when full of the adhesive.

With reference to FIG. 10, it can be seen that the valve body 112 comprises a first valve port 114 providing an opening inside of the shell 104, a second port 116 providing an opening outside of the shell 104, a passageway 118 extending between the first and second ports 114 and 116, and a third port 120 intersecting the passageway 118 and opening outside of the shell 104.

The valve assembly 110 further comprises a valve element 130. This valve element 130 comprises a passageway 132 therethrough to permit flow between the first and second ports 114 and 116 of the valve body 112, and a membrane seal **134*a* blocking this passageway 132. In use, the valve element 130 is movable relative to the valve body 112 between a first position in which it blocks the third port 120 (see FIG. 12), and a second position in which it opens the third port 120 (see FIG. 11**).

The valve body 112 is generally elongate, tubular and cylindrical, and comprises the first valve port 114 at a first end. The valve body 112 comprises a spigot **114*a* which defines the first valve port 114. This spigot 114*a*** comprises an external screw thread.

The valve assembly 110 further comprises a nut 150 for the spigot **114*a*. Both the spigot 114*a* and the nut 150 comprise a flange (spigot flange 115, and nut flange 151**)

between which a portion of the bladder 102 is captured, and sealed against adhesive leaks by way of both an internal and an external washer 152 and 154 clamped between the flanges 115 and 151, and either side of a wall of the bladder 102.

The valve element 130 comprises a generally elongate, tubular and cylindrical body comprising a portion defining a piston 134 at a first end, and a tube connection fitting 136 at a second end, and a portion 138 comprising an external screw thread between the ends. A ring seal such as an O-ring 140 locates in a groove 141 on an outside diameter of the piston 134.

The second port 116 of the valve body 112 is defined by a collar 116*a* provided with an internal screw thread, so that the valve element 130 can be screwed into and out of the valve body 112. The passageway 118 extending between the first and second ports comprises an internal shoulder 119, at which point the passageway 118 transitions to the spigot 114*a*, and which will act as a stop for the piston 134 of the valve element 130.

A bore 120*a* through a side wall of the valve body 112, which extends normal to the passageway 118, defines the third port 120. This bore 120*a* comprises an internal screw thread, via which it receives a tube connection fitting 160 in the form of a nitto style male plug.

The valve body 112 further comprises a groove 172 extending around an outside diameter thereof. In use, this groove receives a clip 170 that will aid with the securement of the valve assembly 110 to the shell 104. The clip 170 comprises a rigid plate with a slotted aperture 174 therethrough. At one end the aperture 174 is larger than the diameter of the valve body 112, and at the other end it is sized so that the edge of the clip 170 surrounding the aperture 174 locates in the groove 172 on the valve body 112. The clip reduces relative movement between the valve assembly 110 and the shell 104 and prevents the valve assembly 110 from being pushed into the shell 104 when tubes are being connected to the valve assembly 110.

In one example, both the valve body 112 and the valve element are moulded from a plastic material. Preferably this will be a recyclable plastic material.

The adhesive cartridge 100 is assembled by firstly, securing the valve assembly 110 to the bladder 102. This is done using the spigot 114*a*, nut 150 and washers 152 and 154 described above. Because the nut 150 and washers 152 and 154 must be fitted on the inside of the bladder 102, an opening in the bladder is required, which can be heat sealed post fitment of the nut 150 and washers 152 and 154 to the spigot 114*a*.

The bladder 102 is then inserted into the shell 104, along with the portion of the valve body 112 up to flange 115, via an opening in the box which can be closed and sealed post insertion. The clip 170 is then passed over the valve body 112 via the enlarged end of the aperture 174 therein, and slid laterally until the other, size matched end of the aperture 174 locates in the groove 172, thereby capturing the edge of the shell 104 surrounding the hole 106 therein between the flange 115 and the clip 170.

A method for filling the adhesive cartridge 100 with adhesive comprises the steps of evacuating the bladder 102 of air using a vacuum pump, and then filling it with the adhesive. It is desirable to evacuate the air first, as this will react with the adhesive.

Figure 15:
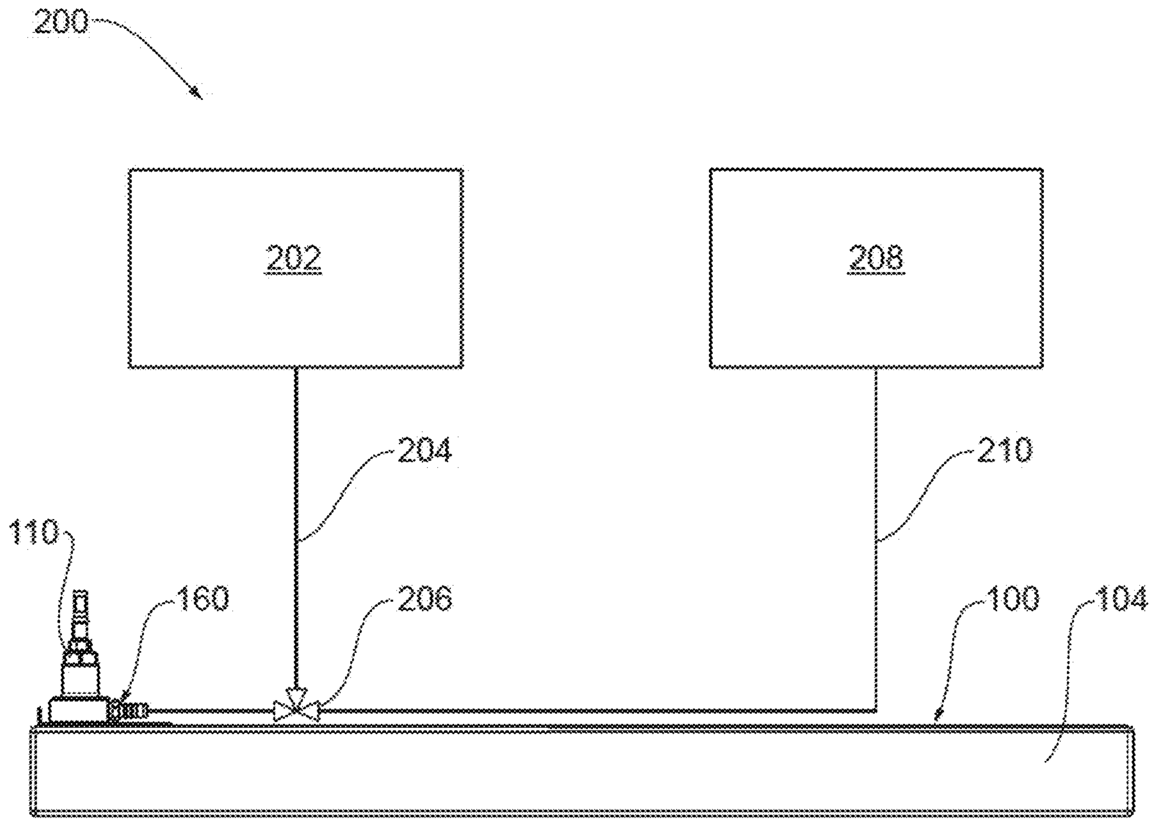

A schematic illustration of a system 200 for filling the adhesive cartridge 100 is illustrated at FIG. 15. This filling system 200 comprises a vacuum pump 202, which can be connected to the valve assembly 110 by an air line 204 via a valve 206. The filling system 200 further comprises a source of adhesive 208, which can be connected to the valve assembly 110 by an adhesive line 210 also via the valve 206. Valve 206 is a T-shaped valve configured to selectably open or close the respective lines to the valve assembly 110.

Figure 11:
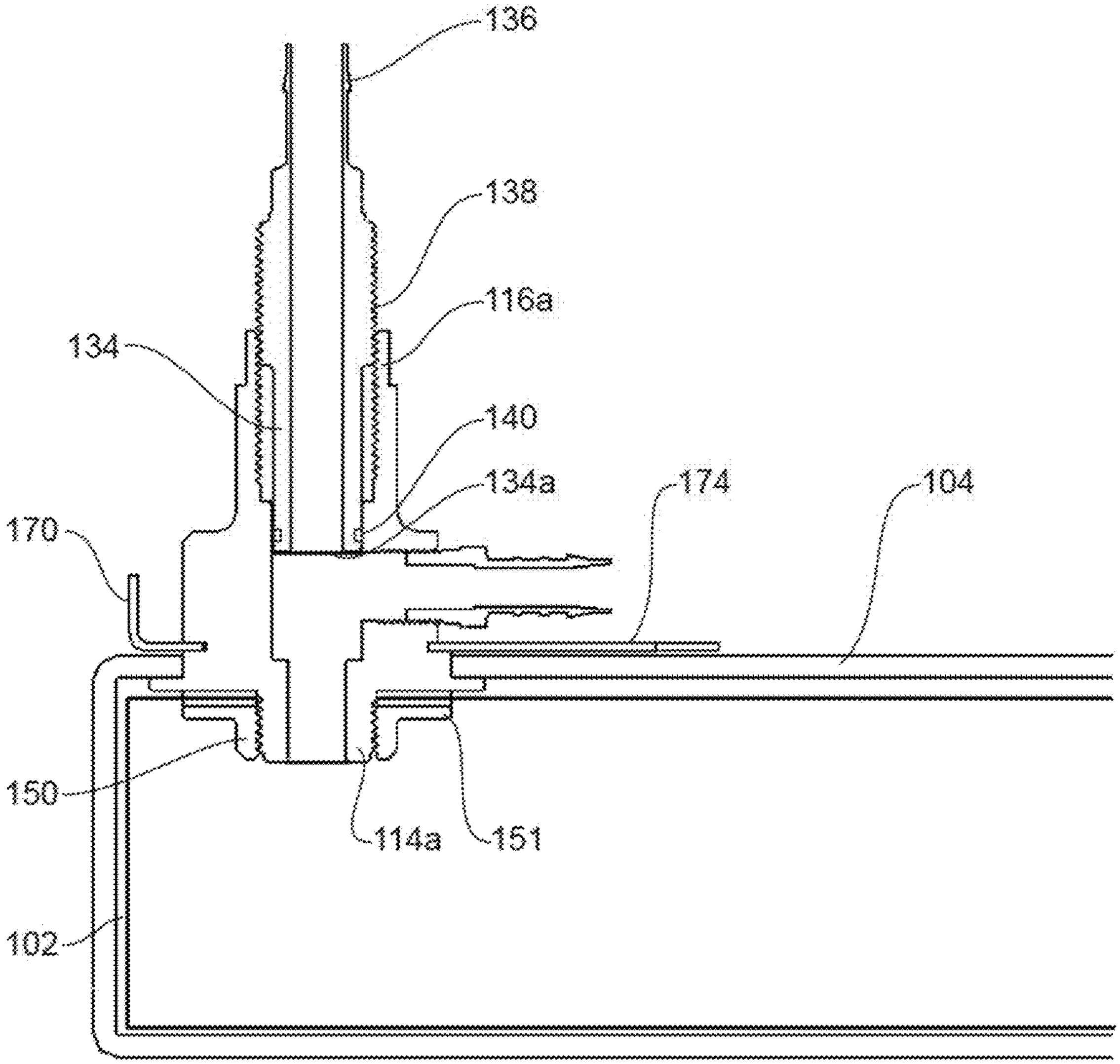
FIGS. 11 through 14 are cross-sectional views through the adhesive cartridge and its valve assembly; and, FIG. 15 is a schematic of a system for filling the adhesive cartridge.

More precisely, this method comprises the step of setting the valve element 130 to its second position, as illustrated in FIG. 11, in which it opens the third port 120, the second port 116 being blocked by the membrane seal 134*a* on the piston 134 end of the valve member 130, and then applying the vacuum pump 202 via the third port 120 to firstly inflate and pressure test the bladder, and if it passes the pressure test, to evacuate the bladder 102 of air. The air line 204 is then closed off using the valve 206.

Figure 12:
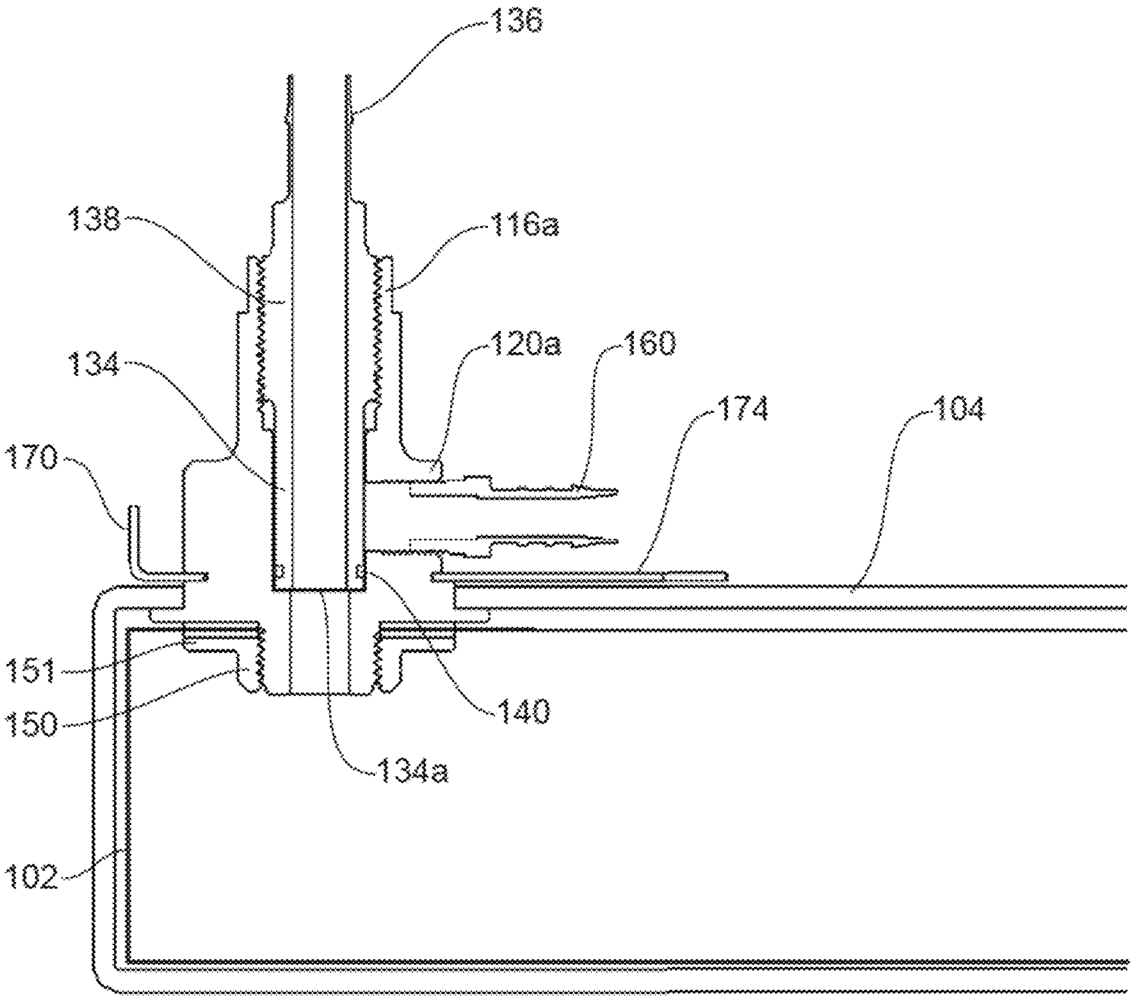

The adhesive is then pumped into the evacuated bladder 102 of the cartridge 100 via the third port 120 until the bladder 102 has been filled. The adhesive line 210 is then closed off using the valve 206. The method then comprises the further step of setting the valve element 130 to its first position (by screwing it inwardly), as illustrated in FIG. 12, in which it closes the third port 120, and seals the bladder 102 via the membrane seal 134*a*.

The fittings 136 and 160 can be fitted with a cap until the cartridge 100 is to be used. These caps will provide some protection against damage, and prevent ingress of dirt and debris.

When a full adhesive cartridge 100 is to be fitted to the lay head 10, it is first secured to the lay head 10 as described above.

Figure 13:
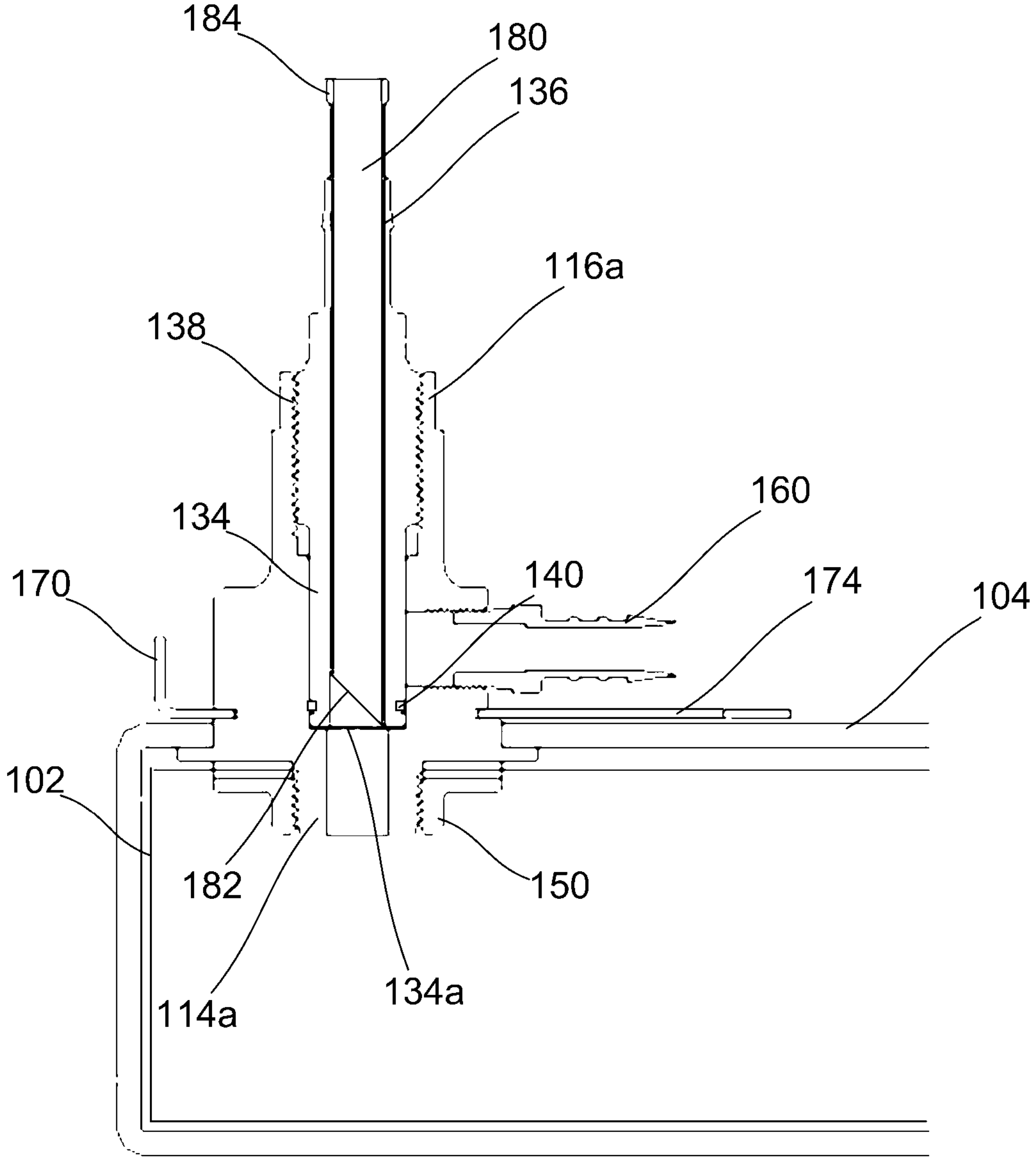
Figure 14:
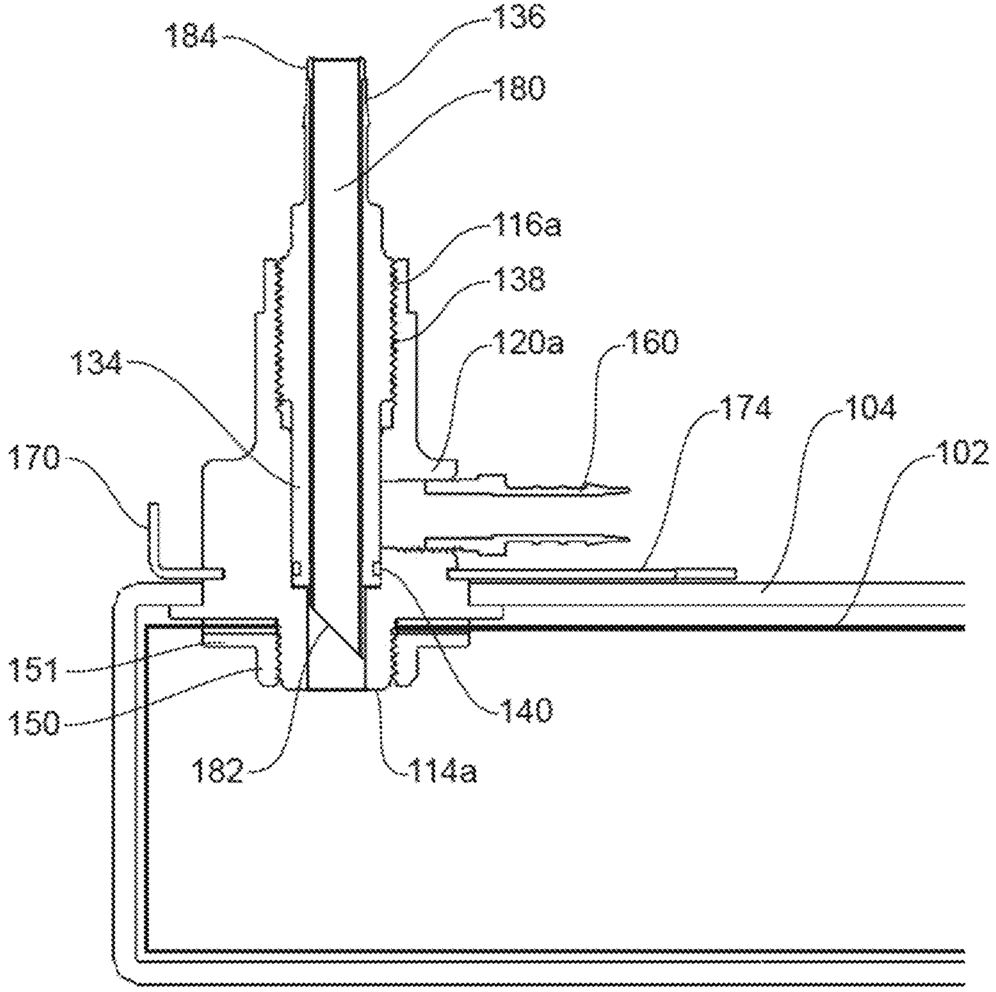

The caps are removed, and a spike shaped adhesive fitting (e.g. spike) 180 with a sharpened tip 182 is then fitted to the supply line via a luer lock thread or another typical pipe connection fitting. This spike 180 is sized for insertion into and down the passageway 132 through the valve member 130, tip 182 first, as illustrated in FIG. 13, until the sharpened tip 182 breaks the membrane seal 134*a*, as illustrated in FIG. 14, bringing the spike 180 into contact with the adhesive. The spike 180 comprises an outward shoulder 184 at the opposite end to the sharpened tip 182. This shoulder 184 will stop against the fitting 136 of the valve member 130 to prevent the spike 180 from being lost into the cartridge 100.

The adhesive supply system of the lay head 10 can then be primed in readiness for use.

It is envisaged that the spike 180 will be supplied with the cartridge 100, and attached thereto such as by way of a dab of adhesive, an adhesive tape or a frangible tether.

The spike could be made from a number of materials, including plastic or stainless steel, and may comprise a seal at its base for preventing adhesive escaping around the outside of the nozzle. It could also be automatically activated to puncture the membrane seal and begin dispensing in some applications.

Advantageously then, the present disclosure provides a replaceable adhesive cartridge on the adhesive dispensing head assembly which it is to supply. This will greatly simplify cleaning and purging of the adhesive system. Moreover, the present disclosure provides methods for filling and fitting an adhesive cartridge which minimises contamination, ingress of air, dirt and other debris and provides for precise dosing.

These adhesive cartridges are replaceable and intended for single-use, and can be changed quickly for reduced downtime.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. An adhesive cartridge for an automated brick laying machine, the adhesive cartridge comprising a bladder for the adhesive, a shell for the bladder, the shell comprising an aperture therethrough, and at least one valve assembly for controlling adhesive flow, the valve assembly comprising a valve body, at least a portion of which extends through the aperture and into the shell and wherein the valve assembly is configured to allow controllable adhesive filling of and dispensing from the adhesive cartridge; and wherein the at least a portion of the valve body also extends through an aperture in the bladder and the valve body comprises a first valve port providing an opening inside of the bladder, a second port providing an opening outside of the shell, a passageway extending between the first and second ports, and a third port intersecting the passageway and opening outside of the shell.

2. The adhesive cartridge of claim 1, further comprising a valve element which comprises a passageway therethrough to permit flow between the first and second ports of the valve body, a membrane seal blocking this passageway, and wherein the valve element is movable relative to the valve body between a first position in which it blocks the third port, and a second position in which it opens the third port, wherein the valve assembly includes a seal between the valve body and the valve element to prevent ingress of adhesive therebetween and the valve element has a thread or barb to assist in positioning thereof relative to the valve body.

3. The adhesive cartridge of claim 2, wherein the valve element comprises a generally elongate, tubular and cylindrical body comprising a portion defining a piston at a first end, and a tube connection fitting at a second end, and a portion comprising an external screw thread between the ends.

4. The adhesive cartridge of claim 3, wherein the second port of the valve body is defined by a collar provided with an internal screw thread, so that the valve element can be screwed into and out of the valve body.

5. A method for filling the adhesive cartridge of claim 2 with adhesive, the method comprising the steps of evacuating the bladder of air using a vacuum pump, and then filling the bladder with the adhesive, the step of evacuating the bladder including moving the valve element to its second position, in which it opens the third port, and then applying the vacuum pump via the third port to evacuate air from the bladder.

6. The method of claim 5, wherein post evacuation, the method comprises the further step of pumping adhesive into the cartridge via the third port, and then setting the valve element to its first position, in which it closes the third port to seal the adhesive in the cartridge, wherein the adhesive is pumped into the cartridge from an adhesive supply via a first line which is connected to the third port via a valve that is also connected to the vacuum pump via a second line, the valve operable to selectively open and close each line to the third port.

7. A method of preparing the adhesive cartridge of claim 2 for use with an automated bricklaying machine including a brick laying and adhesive applying head, the method comprising the steps of securing the adhesive cartridge to the brick laying and adhesive applying head and connecting a supply line to the adhesive cartridge.

8. The method of claim 7, wherein the method comprises the further steps of securing an adhesive fitting with a sharpened tip to the supply line, and then inserting the adhesive fitting into and down the passageway through the valve element tip first, until the sharpened tip punctures the membrane seal, to thereby allow adhesive to flow from the bladder into the supply line.

9. The adhesive cartridge of claim 1, wherein the valve body is generally elongate, tubular and cylindrical, and comprises the first valve port at a first end, the second valve port at a second end, and the third valve port in a side thereof.

10. The adhesive cartridge of claim 1, wherein a spigot defines the first valve port, and the spigot comprises an external screw thread and wherein the adhesive cartridge further comprises a nut for the spigot, where both the spigot and the nut comprise a flange between which a portion of the bladder is captured, and sealed against adhesive leaks by way of at least one washer clamped between the flanges and wherein the third valve port comprises an internal thread for receiving a tube connection fitting.

11. The adhesive cartridge of claim 1, wherein the valve body further comprises a groove extending around an outside diameter thereof, wherein in use, this groove receives a clip to assist in the securement of the valve assembly to the shell, wherein the clip reduces relative movement between the valve assembly and the shell.

12. The adhesive cartridge of claim 1, wherein the adhesive cartridge comprises a cuboid shape and the shell comprises a box, wherein the shell is made of a material selected from cardboard, corflute, plastic or a hybrid material and optionally the material has a water resistant coating that is further optionally reflective.

13. The adhesive cartridge of claim 1, wherein the bladder is made of a flexible aluminium composite foil.

14. The adhesive cartridge of claim 1, wherein the cartridge is for a single-use.

15. The adhesive cartridge of claim 1, wherein the adhesive cartridge is adapted to be releasably secured with respect to a brick laying and adhesive applying head of an automated brick laying machine and supply an adhesive for application onto bricks when secured.

16. A method for assembling the adhesive cartridge of claim 1, the method comprising the steps of securing the valve assembly with respect to the bladder, and then placing the bladder, and a portion of the valve assembly, inside of the shell and then securing the valve assembly with respect to the shell.

17. A brick laying and adhesive applying head assembly for an automated brick laying machine, wherein the head assembly is adapted to releasably retain an adhesive cartridge of claim 1 that is configured to dispense adhesive therefrom onto a brick.

18. An automated brick laying machine comprising the brick laying and adhesive applying head assembly of claim 17.

19. An adhesive cartridge for an automated brick laying machine, the adhesive cartridge comprising a bladder for the adhesive, a shell for the bladder, the shell comprising an aperture therethrough, and at least one valve assembly for controlling adhesive flow, the adhesive cartridge being characterized in that the valve assembly comprises a valve body comprising a first port providing an opening inside of the bladder, a second port providing an opening outside of the shell, a passageway extending between the first port and the second port, and a third port intersecting the passageway and opening outside of the shell wherein the valve assembly further comprises a valve element which comprises a passageway therethrough to permit flow between the first port and the second port of the valve body, a membrane seal blocking this passageway, and wherein the valve element is movable relative to the valve body between a first position in which it blocks the third port, and a second position in which it opens the third port, wherein the valve assembly, so as to allow controllable adhesive filling of, and dispensing from, the adhesive cartridge, and wherein the adhesive cartridge is adapted to be releasably secured and connected with respect to the automated brick laying machine, so as to supply an adhesive for application onto bricks by the automated brick laying machine.

* * * * *